US012662797B2

(12) United States Patent
Schneider et al.

(10) Patent No.: US 12,662,797 B2
(45) Date of Patent: Jun. 23, 2026

(54) PROPULSION POWER CONTROL IN ELECTRICAL WORK MACHINES

(71) Applicant: Caterpillar Inc., Peoria, IL (US)

(72) Inventors: Karl P. Schneider, Decatur, IL (US);
Cameron T. Lane, Oro Valley, AZ
(US); Andrew Olson, Vail, AZ (US)

(73) Assignee: Caterpillar Inc., Peoria, IL (US)

( * ) Notice: Subject to any disclaimer, the term of this
patent is extended or adjusted under 35
U.S.C. 154(b) by 66 days.

(21) Appl. No.: 18/430,699

(22) Filed: Feb. 2, 2024

(65) Prior Publication Data
US 2025/0250768 A1 Aug. 7, 2025

(51) Int. Cl.
| | |
|---|---|
| *E02F 9/20* | (2006.01) |
| *B60L 50/60* | (2019.01) |
| *B60W 10/08* | (2006.01) |
| *B60W 10/26* | (2006.01) |
| *G06N 3/08* | (2023.01) |

(Continued)

(52) U.S. Cl.
CPC ............ *E02F 9/2091* (2013.01); *B60L 50/60*
(2019.02); *E02F 9/20* (2013.01); *E02F 9/2054*
(2013.01); *G06N 3/08* (2013.01); *B60W 10/08*
(2013.01); *B60W 10/26* (2013.01); *G06N 5/02*
(2013.01); *G07C 5/04* (2013.01)

(58) Field of Classification Search
CPC ......... E02F 9/2091; E02F 9/2054; E02F 9/20;
B60L 50/60; B60L 11/18; B60W 10/08;
B60W 10/26; G06N 3/08; G06N 5/02;
G07C 5/04
See application file for complete search history.

(56) References Cited

U.S. PATENT DOCUMENTS 9,079,505 B1 7/2015 Hyde et al.
2020/0070679 A1* 3/2020 Wang ..................... B60L 58/21
(Continued)

FOREIGN PATENT DOCUMENTS

| CN | 117002474 A | * 11/2023 | ............ B60W 20/15 |
|---|---|---|---|
| CN | 117261868 A | * 12/2023 | ............ B60W 20/15 |

(Continued)

OTHER PUBLICATIONS

CN-117261868 Hao original and machine translatio (Year: 2023).*
(Continued)

*Primary Examiner* — Kito R Robinson
*Assistant Examiner* — Zachary E. F. Glade

(57) ABSTRACT

A power delivery control apparatus for work machines that
derive propulsion power from electrical power sources dur-
ing a work task includes data processor circuitry and power
controller circuitry. The data processor circuitry is con-
structed to accept a data set indicating a propulsion power
requirement for performing the work task and to generate
power delivery limit data from the data set. The power
delivery limit data defines a propulsion power delivery limit
on the propulsion power derived from the electrical power
sources during the work task. The power controller circuitry
of a distinguishably identifiable work machine is commu-
nicatively coupled to the data processor circuitry and con-
structed to accept the power delivery limit data from the data
processor circuitry and to enforce the propulsion power
delivery limit during performance of the work task.

20 Claims, 9 Drawing Sheets

(51) Int. Cl.
G06N 5/02          (2023.01)
G07C 5/04          (2006.01)

(56)                    References Cited

U.S. PATENT DOCUMENTS

| | | |
|---|---|---|
| 2022/0363238 A1 | 11/2022 | Li et al. |
| 2023/0222852 A1 | 7/2023 | Duan et al. |

FOREIGN PATENT DOCUMENTS

| | | | | |
|---|---|---|---|---|
| JP | 2017-001442 A | 1/2017 | | |
| JP | 2017-154565 A | 9/2017 | | |
| KR | 10-2023-0146755 A | 10/2023 | | |
| WO | WO-2018103604 A1 * | 6/2018 | ............. | B60L 58/10 |
| WO | WO-2020044597 A1 * | 3/2020 | ............. | G06Q 50/10 |

OTHER PUBLICATIONS

WO_2018103604 original and machine translation (Year: 2018).*
WO_2020044597 original and machine translation (Year: 2020).*
CN_117002474 original and machine translation (Year: 2023).*
Written Opinion and International Search Report for Int'l. Patent
Appln. No. PCT/US2025/012011, mailed Apr. 21, 2025 (10 pgs).

* cited by examiner

700

702

SPEED TARGET ((SPEED > TARGET && DECELERATION < THRESHOLD)
||
(SPEED < TARGET && ACCELERATION > THRESHOLD
&& THROTTLE > THRESHOLD))?

YES

NO

704

MACHINE DATA
(PAYLOAD,
TOTAL MASS,
GRADE)

706

REQUIRED POWER
PREDICTION (SPEED *
GRADE * GRAVITY *
MASS)

708

POWER ADJUSTMENT
(TARGET SPEED GAP &
PREDICTED REQUIRED
POWER VS CURRENT)

MODEL

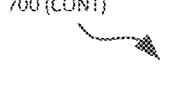

700 (CONT)

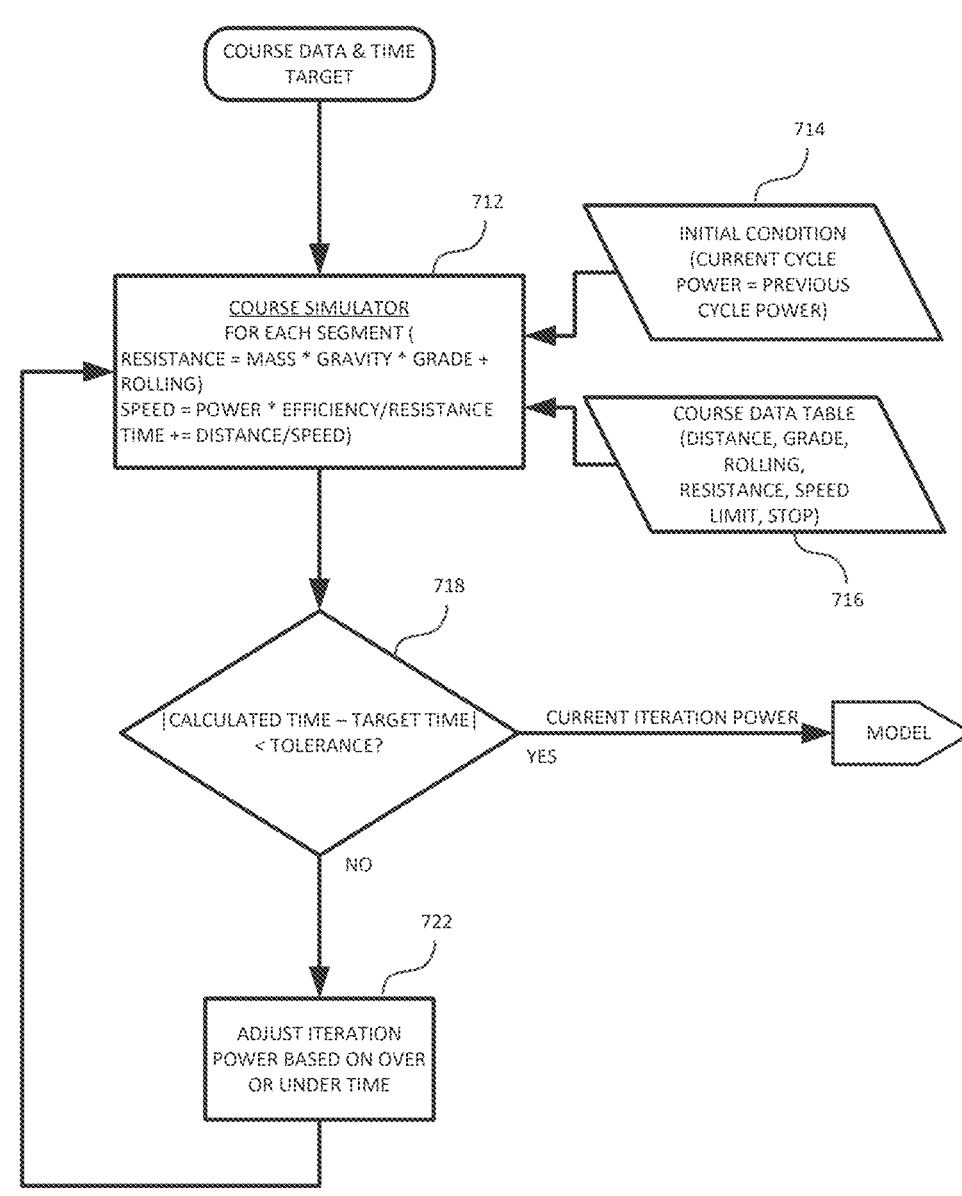

COURSE DATA & TIME TARGET

714

INITIAL CONDITION (CURRENT CYCLE POWER = PREVIOUS CYCLE POWER)

712

COURSE SIMULATOR
FOR EACH SEGMENT (
RESISTANCE = MASS * GRAVITY * GRADE + ROLLING)
SPEED = POWER * EFFICIENCY/RESISTANCE
TIME += DISTANCE/SPEED)

COURSE DATA TABLE (DISTANCE, GRADE, ROLLING, RESISTANCE, SPEED LIMIT, STOP)

716

718

|CALCULATED TIME – TARGET TIME| < TOLERANCE?

CURRENT ITERATION POWER

MODEL

YES

NO

722

ADJUST ITERATION POWER BASED ON OVER OR UNDER TIME

FIG. 7B 700 (CONT)

PROPULSION POWER CONTROL IN ELECTRICAL WORK MACHINES

TECHNICAL FIELD

The present disclosure relates to adaptively and/or dynamically controlling propulsion power in electrical work machines to meet machine performance and/or fleet management criteria.

BACKGROUND

Electrical work machines, e.g., battery electric machines, manifest several challenges and opportunities relating to power management. First, in the case of battery power sources, onboard battery capacity is sized for run time and not delivered power as in engine based machines. Further, battery and fuel cell power sources, degradation can reduce charge capacity and/or increase losses and can become severe over time. The heat load internal to the power source can also increase over time as the machine ages, and the work machine's cooling capacity may eventually be exceeded. Auxiliary loads in combination with internal thermal management can generate highly variable transients. Steady state anomalies also occur as the battery, for example, degrades to the point where a constant output battery power no longer translates to previously attained consistent wheel power and grade performance, resulting in fleet bunching and other issues. Battery life has a significant cost impact on the lifetime cost of a battery electric machine, and battery life is impacted by degradation factors that are based on, for example, state of charge, cycle depth of discharge, temperature and current.

Most current battery applications (e.g., automobiles) age out, whereas battery life in battery electric machine applications degrades or is otherwise made shorter from cyclic aging (e.g., charge, deplete, recharge cycles) due to operational factors. Cyclic aging is generally not a concern in prevailing internal combustion technology (e.g., refueling cycles), which instead focuses on fuel consumption, power, emissions and powertrain life—not battery life. In other systems currently available, the focus is on run time/distance and other component durability measures, not explicitly battery life factors and lifecycle cost/efficiency. This is an important distinction; automotive batteries usually last the automotive lifecycle (for instance TESLA claims 300-500k miles battery lifetime, which is well beyond the typical automotive lifecycle. Accordingly, lifecycle cost for the automotive battery beyond initial purchase is not considered.

US Patent Application Publication 2022/0363238 is directed to a method and system for controlling a powertrain in a hybrid vehicle. The disclosed system generally includes a control module for operation of the hybrid engine, a power electronics module, a battery, and automated manual transmission. The system may include information regarding a route and a fleet of machines. The reference discloses that operator information may include operator requests that the fleet management module has for powertrains for each vehicle. The powertrain has different presets, where emphasis may be placed on e.g., optimizing fuel economy, overall performance, emissions, and component life of the powertrain. The engine is then controlled to drive the powertrain and an optimizer module decides the power management strategy for the vehicle based on the current route information and current vehicle status information, for example by using online learning from historical and lookahead data.

The system can select between different modes of operation-full battery, hybrid electric, battery charging mode, regenerative braking mode, etc. The disclosed power management strategy may focus on maximizing battery operating range and power derate (performance).

In light of the prevailing technology, it is apparent to those skilled in power management that extending the battery end of life under influence of operational factors is a subject of engineering and product development efforts.

SUMMARY

In one aspect of the present inventive concept, a power delivery control apparatus for work machines that derive propulsion power from electrical batteries includes data processor circuitry constructed to accept a data set from which an immediate battery-sourced power level can be computed. A future propulsion power level is estimated from the data set that meets a battery-use management target and power delivery limit data is generated from the computed future propulsion power level, where the power delivery limit data indicates a propulsion power delivery limit. The power delivery control apparatus may include further power controller circuitry of a distinguishably identifiable work machine constructed to accept the power delivery limit data from the data processor circuitry. The propulsion power of the distinguishably identifiable work machine is limited to the accepted power delivery limit regardless of a request for propulsion power beyond the power delivery limit.

In another aspect of the present inventive concept, a system is constructed to coordinate machine propulsion across distinguishably identifiable work machines performing respective work tasks at distinguishably identifiable work sites. Each of the work machines deriving propulsion power from distinguishably identifiable electrical power sources onboard each of the work machines. The system includes an enterprise infrastructure communicatively coupled to the work machines and including memory circuitry constructed to retain a database therein. The electrical power sources are associated with the corresponding work machines and the work machines with the corresponding work sites. The enterprise infrastructure including data processor circuitry constructed to execute management process instructions to coordinate propulsion across the work machines associated with the electrical power sources and with the work sites in the database. The propulsion being coordinated across the work machines through selection of respective performance targets. The data processor circuitry accepting power levels associated with the respective performance targets. The system includes further power controller circuitry deployed on the respective work machines constructed to generate propulsion power delivery limits from propulsion power levels computed through artificial intelligence implementing computational models of the respective work machines. The computational models are trained on data samples including the propulsion power level selected in accordance with the respective performance targets. The propulsion power of each of the work machines is limited to the propulsion power delivery limit regardless of demand for the propulsion power beyond the propulsion power delivery limit.

In yet another aspect of the present inventive concept, a method of power delivery control is provided for work machines that derive propulsion power from electrical power sources during a work task. The method includes accepting a data set indicating a propulsion power requirement for performing the work task and generating power delivery limit data from the data set defining a propulsion power delivery limit on the propulsion power during performance of the work task. The propulsion power of the work machine is limited to the propulsion power delivery limit during performance of the work task regardless of demand for the propulsion power beyond the propulsion power delivery limit.

BRIEF DESCRIPTION OF THE DRAWINGS

FIGS. 7A-7C, collectively referred to herein as FIG. 7, is a flow diagram of an exemplary propulsion power delivery control process based on an exemplary offboard input configuration as may be implemented in embodiments of the present inventive concept.

DESCRIPTION OF EXAMPLE EMBODIMENTS

Figure 1:
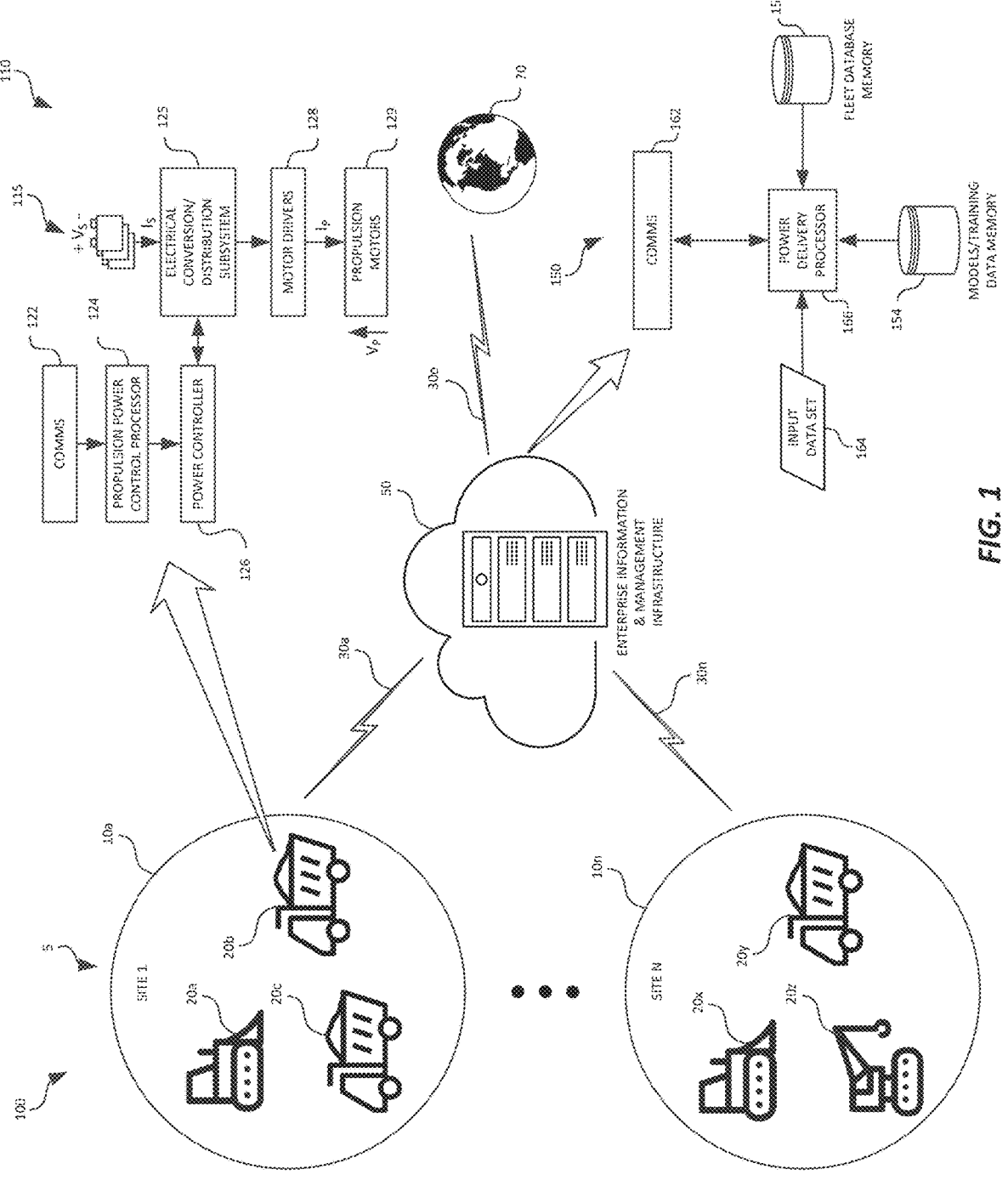
FIG. 1 is a schematic illustration of an exemplary enterprise in which the present inventive concept may be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

Additionally, mathematical expressions are contained herein, and those principles conveyed thereby are to be taken as being thoroughly described therewith. It is to be understood that where mathematics is used, such is for succinct description of the underlying principles being explained and, unless otherwise expressed, no other purpose is implied or should be inferred. It will be clear from this disclosure overall how the mathematics herein pertains to the present invention and, where embodiment of the principles underlying the mathematical expressions is intended, the ordinarily skilled artisan will recognize numerous techniques to carry out physical manifestations of the principles being mathematically expressed.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

The techniques described herein are directed to dynamically adjusting propulsion power in a battery electric machine, including large machines used in construction and mining. Upon review of this disclosure and appreciation of the concepts disclosed herein, the ordinarily skilled artisan will recognize other battery-sourced power delivery control contexts in which the present inventive concept can be applied. The scope of the present invention is intended to encompass all such alternative implementations.

FIG. 1 is a schematic illustration of an exemplary enterprise 100 in which the present inventive concept may be embodied. In the illustrated example, it is to be assumed that enterprise 100 includes among its assets a fleet 5 of work machines 20a-20z, representatively referred to herein as work machine(s) 20. Work machines 20 may be distributed over one or more work sites 10a-10n, representatively referred to herein as work site(s) 10, that may include sites at which active work, e.g., construction, mining, etc., is done, sites at which scheduled or depot maintenance, e.g., major troubleshooting and repairs, rebuilds, etc., is done, sites at which inactive work machines 20 are simply parked, and so on. Optional management of fleet 5 may be achieved under enterprise-level control such as that described in more detail below. For purposes of the present discussion, it is sufficient to assume that such fleet management may be realized in circuitry, processes and interfaces implemented on exemplary enterprise information and management infrastructure (EIMI) 50. However, it is to be understood that the present inventive concept may be realized without a fleet management system; only onboard controls and configurations are implemented.

EIMI 50 may be communicatively coupled to each work machine 20 in fleet 5, either directly or through one or more edge communication devices, through communication channels 30a-30n. Additionally, EIMI 50 may be communicatively coupled to external information sources 70 (e.g., World Wide Web) through a communication channel 300. Communication channels 30a-300 are representatively referred to herein as communication channel(s) 30. Whereas the present inventive concept is agnostic to the composition of communication signals and to the medium on which communication channels 30 are constructed, it is to be assumed for purposes of explanation and not limitation that communications in the present example are conducted by radio telecommunications. To that end, operational resources 110 of each exemplary work machine 20 may include a communications module 122 and operational resources 150 of exemplary EIMI 50 may include a communications module 162. Here, the term "operational resources" is intended to refer to physical component(s) by which an individual work machine 20 performs productive work (excavating, surface milling, material hauling, etc.) to design specifications including, without being limited to the mechanical supporting structure, power source(s), power sink(s) (e.g., electrically-powered machinery), power conversion (e.g., electrical inverters) device(s), power distribution (e.g., current carrying cables and other conductors) network(s), signal (e.g., from sensors) distribution network(s), signal and data processor circuitry (analog signal processing circuits, digital logic circuits, peripheral controllers, microprocessors, digital signal processors, artificial intelligence processors), memory circuitry (volatile and nonvolatile), etc. The term "power" is intended to connote the product of electrical current passing through an electrical node and the electrical potential measured at that electrical node. Source power then is defined as the battery voltage Vs (which may vary with battery state of charge) multiplied by the battery current $I_S$. Delivered power is equivalent to specifying instantaneous drive power, which is defined as propulsion motor current $I_P$ for a given voltage $V_P$ measured across the propulsion motor.

Operational signals, commands and/or data may be conveyed between EIMI 50 and individual work machines 20 through communication channel(s) 30. By way of such communications, operational resources 110 and operational resources 150 may interoperate to control propulsion power delivered to propulsion motors 129 from a set of batteries 115 that provide source current $I_S$ at source voltage Vs in accordance with an input data set 164. However, prior to further discussing exemplary functionality of embodiments of the present inventive concept, it is believed beneficial to first define certain terms used throughout the descriptions herein.

Figure 2:
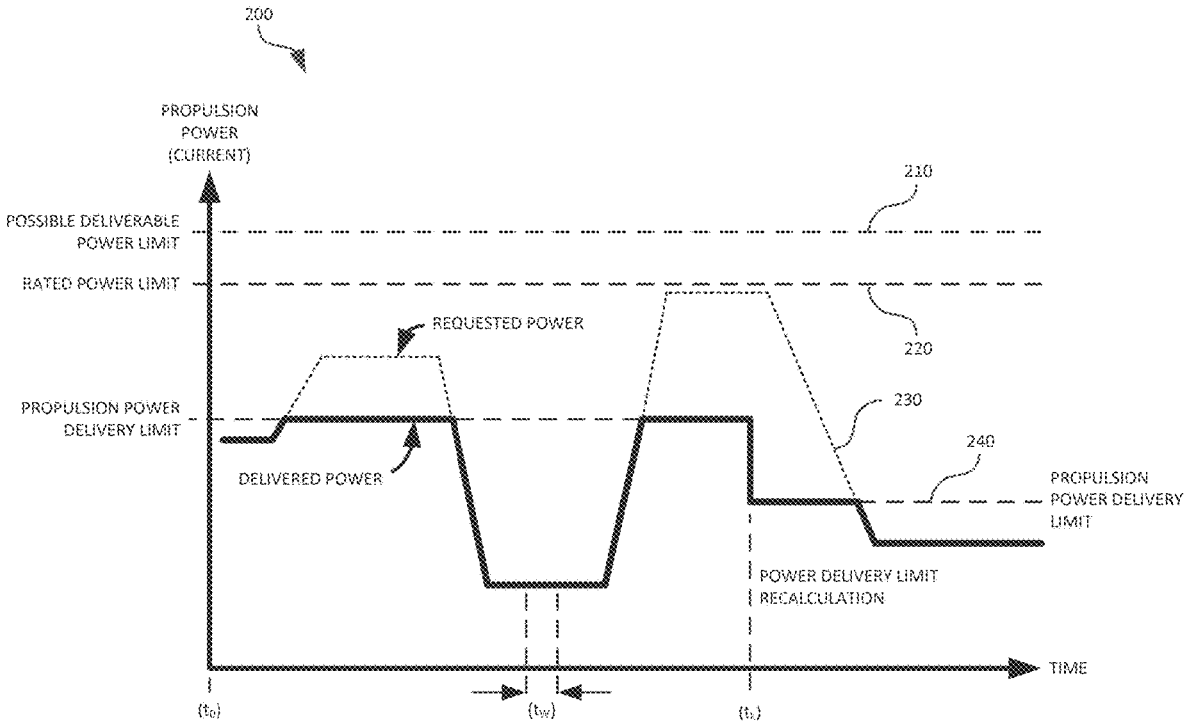
FIG. 2 is a graph depicting an exemplary delivered propulsion power curve that may be implemented by embodiments of the present inventive concept.

FIG. 2 is a graph depicting an exemplary delivered power curve 200 (illustrated in heavy line) that may be implemented by embodiments of the present inventive concept. The illustrated example is that of a single work machine 20, where each work machine 20 in fleet 5 may be assigned its own "delivered power" curve 200. Herein, "delivered power" is intended to refer to electrical power that is provided at the input of propulsion motors 129 of the work machine 20, e.g., delivered propulsion current $I_P$×propulsion voltage $V_P$ measured across propulsion motor 129. The term "requested power," on the other hand, is intended to refer to electrical power that is demanded by the work machine 20, e.g., by the operator thereof activating an accelerator control, by the machine control itself or by offboard system requests, in performance of a work task.

As FIG. 2 illustrates, each work machine 20 may have a "possible propulsion power limit" 210, which is the maximum power delivery achievable by an individual work machine 20 as opposed to a "rated propulsion power limit" 220, which is the maximum propulsion power specified by the manufacturer for the species (functional type, model, feature package, etc.) of a work machine 20. Under operation per design specifications, an individual work machine 20 may request power to be delivered to propulsion motors 129 at any level below rated propulsion power limit 220. An exemplary "requested propulsion power delivery" curve 230 is illustrated in the figure.

Embodiments of the present inventive concept provide for controlled power delivery to propulsion motors 129 in which delivered power is limited to meet a battery-use management target regardless of the level of requested power. For example, for each estimation cycle $t_W$, which may be a configurable time window that can be reduced to the system processing sample period (i.e., essentially instantaneously to the extent of machine processing capabilities), a propulsion power delivery limit 240 may be established on the requested propulsion power 230. This limit may hold true for dynamic embodiments in which propulsion power delivery level, and the associated power delivery limit 240, is recalculated, such as demonstrated at t=t_X.

Returning now to FIG. 1, each work machine 20 may include propulsion power delivery control processor 124 that may be communicatively coupled to communications component 122 and may be constructed or otherwise configured to decode, format, or otherwise configure propulsion power delivery data into data from which a propulsion power delivery limit can be enforced. The propulsion power delivery limit may be provided to a power controller 126, where it may be formatted, converted, or otherwise transformed into control signals by which an electrical power conversion/distribution subsystem 125 may control the level of deliverable propulsion power, i.e., propulsion motor current $I_P$×propulsion motor voltage $V_P$ at propulsion motors 129 through motor drivers 128.

Operational resources 150 of EIMI 50 may include a power delivery processor 166 that is constructed or otherwise configured to compute the propulsion power delivery data that may be conveyed to a selected work machine 20 through communication component 162 to communication component 122 through communication channel(s) 30. Power delivery processor 166 may implement one or more control techniques, including techniques using artificial intelligence models and training data that mimic targeted functions of individual work machines 20 when executed by suitably constructed processing circuitry. Artificial intelligence models and training data may be retained in artificial intelligence models/training data memory 154. The propulsion power delivery estimation processes of power delivery processor may accept and operate in accordance with an input data set 164 that defines parameters on which control operations are based. Power delivery processor 166 may implement features by which groups of work machines 20 may be controlled concurrently with respect to propulsion power delivery control, such as those work machines 20 of a specific type, at a specific work site 10, having certain battery types, and so on. Accordingly, power delivery processor 166 may be provided to information regarding the work machines 20 in fleet 5 that may be stored in fleet database memory 152.

Figure 3:
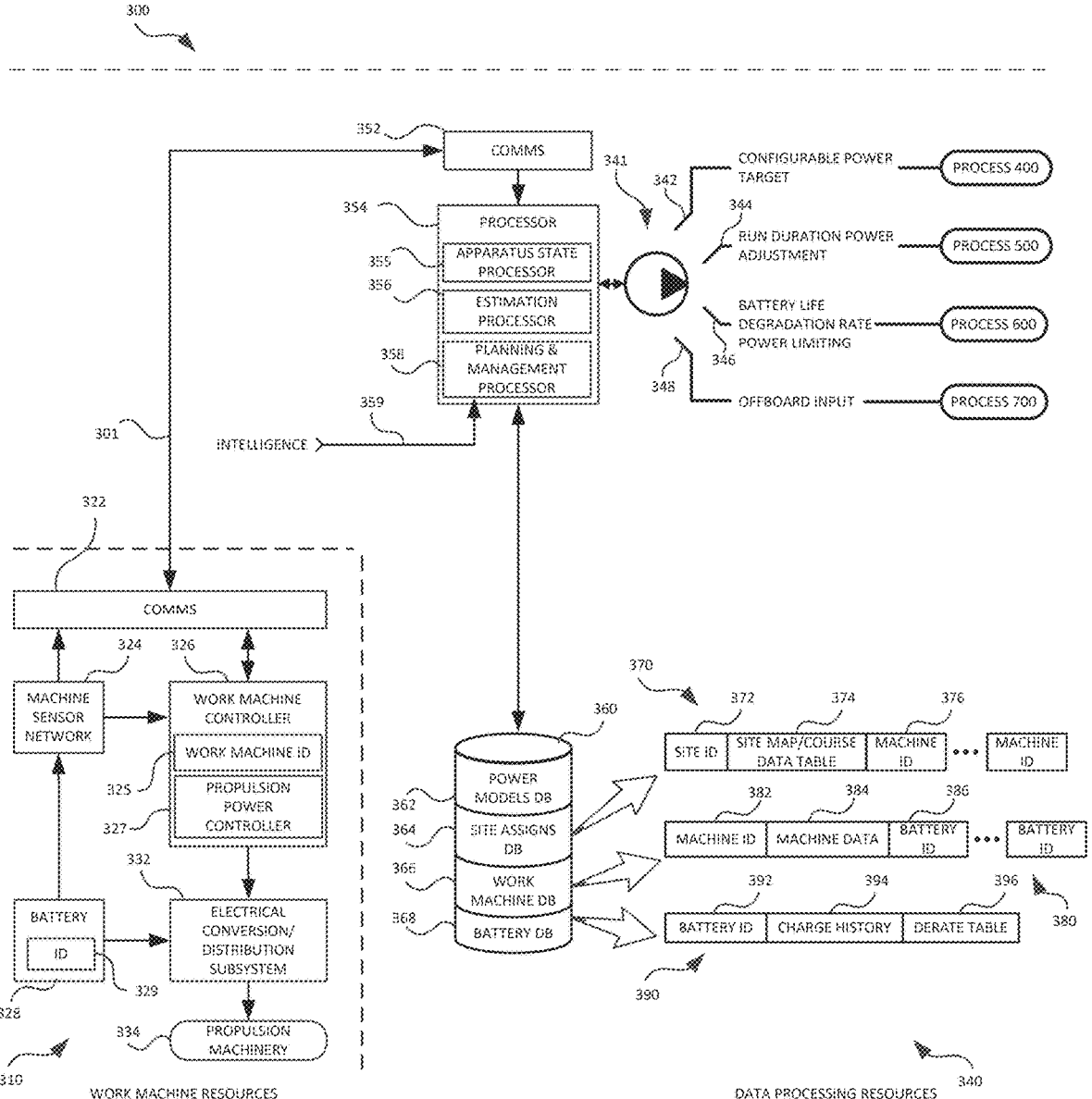
FIG. 3 is a schematic block diagram of an exemplary propulsion power control apparatus (PPCA) by which the present inventive concept can be embodied.

FIG. 3 is a schematic block diagram of an exemplary propulsion power control apparatus (PPCA) 300 by which the present inventive concept can be embodied. PPCA 300 may be viewed as comprising work machine resources 310, through which work is performed for which the applicable work machine 20 was designed (e.g., hauling, excavating, road surface milling, etc.) and on which battery set 328, alternatively referred to herein as battery(-ies) 328, and propulsion machinery 334 are located. PPOA 300 may be additionally viewed as comprising data processing resources 340 by which propulsion power delivery data are computed and provided to work machine resources 310 for propulsion power delivery control thereat. Offboard computation is optional and has visibility to the larger picture of the fleet, such that the entire production chain can be better balanced. For example, when there are not enough trucks to fully burden an excavator, offboard processing may recommend or compel an increase in power to maximize production, and vice-versa, as opposed waiting on the work machine 20 at the shovel, or vice-versa. When so embodied, work machine resources 310 and data processing resources 340 may be communicatively coupled one with the other through a communication channel 301 constructed between communication component 322 among work machine resources 310 and communication component 354 among data processing resources 340. It is to be understood, however, that certain embodiments may deploy various data processing resources 340 among work machine resources 310, and vice-versa. For example, when onboard data processing and storage facilities are sufficient, functional components illustrated as being among data processing resources 340 may be physically realized onboard work machine 20 and removed from offboard processing of data processing resources 340. Certain embodiments may deploy substantially all of offboard processing by data processing resources 340 as work machine resources 310 such that propulsion power delivery data that is conveyed over communication channel 301 is kept at a minimum.

With respect to propulsion, each work machine 20 in fleet 5 may be outfitted with similar work machine resources 310 by which electrical power from battery set 328 is delivered to propulsion machinery 334. As illustrated in FIG. 3, work machine resources 310 may include a work machine controller 326 that is constructed or otherwise configured to control the functions, processes, and operations of work machine 20, characteristics of which may be monitored and/or measured by a machine sensor network 324. Work machine controller 326 may include a propulsion power controller 327 comprising processing and memory circuitry dedicated to controlling propulsion power provided to propulsion machinery 334 (e.g., motors, driven gear works, if any, and internal thermal management, if any, etc.). For example, propulsion power controller 327 may configure and convey a set of signals to electrical conversion/distribution subsystem 332 through which alternating current for driving propulsion motors in propulsion machinery 334 is derived from direct current produced by battery set 328. Alternating current levels may be set through, for example, modifying timing signals that control propulsion power inverters included in, for example, electrical conversion/distribution subsystem 332.

A single work machine 10 may store and optionally offboard its data. However, when more than one machine is considered, data processing resources 340 may coordinate activities among work machines. Data processing resources 340 may include memory circuitry 360 that is sufficient to persistently store data structures, such as a power models database 362 constructed or otherwise configured to store processor-readable models of work machines 20 and their subsystems, a circuit assignment database 364 constructed or otherwise configured to store processor-readable data associating work machines 20 with corresponding work sites 10, a work machine database 366 constructed or otherwise configured to store processor-readable data on work machines 20 and to associate battery sets 328 therewith, and a battery database 368 constructed or otherwise configured to store information on each battery 328 in fleet 5 or even across enterprise 100. Memory circuitry 360 may be communicatively coupled to processor circuitry 354 realized in data processing resources 340. Processor circuitry 354 may be constructed or otherwise configured to support controlled power delivery, such as that achieved by the inventive principles described herein, though, for example, an apparatus state processor 355 constructed or otherwise configured to maintain the state of work machine 20 in view of input data set 164, which is selected and formatted through configuration selector 341, an estimation processor 356 constructed or otherwise configured to compute a propulsion power delivery limit 240 based on the apparatus state computed by apparatus state processor 355 and input data set 164 from configuration selector 341, and a planning and management processor 358 constructed or otherwise configured to interface with a user for fleet management purposes, including propulsion power delivery control at a group level, e.g., work machines 20 at a particular work area 10, the entire fleet 5 and/or any subset of work machines 20 therein. Planning and management processor 358 may be further constructed or otherwise configured to accept outside intelligence 359, such as from external information sources 70. Outside intelligence 359 and offboard input data that are indicative of site course information regarding the lanes of travel within a area 10 and/or fleet management information may be tracked and analyzed by planning and management processor 358 to configure a propulsion power delivery limit estimation.

Embodiments of the present inventive concept may include battery identifiers (IDs) 329 by which batteries 328 in enterprise 100 can be distinguished one from another. When so embodied, PPOA 300 may store pertinent information regarding each battery 328 in a battery DB entry 390 of battery DB 368 in an association with a battery ID field 392. Such information may include a charge history log 394 in which charging information for the battery 328 associated with the battery ID in battery ID field 392 is stored, and a derating table 396 in which temperature dependent derating factors for the battery 328 associated with the battery ID in battery ID field 392 may be stored. It is to be understood that battery ID 329 may be mechanically attached to the battery 328 it identifies, such as by a serial number on an adhesive product panel and/or by electronic storage implemented on battery 328 that stores battery ID 329 with other battery specific data.

Similarly, each work machine 20 may be associated with a work machine ID 325 which may be stored in a machine ID field 382 of work machine DB entry 380 in work machine DB 366. Work machine ID 325 stored in machine ID field 382 may be associated in work machine DB entry 380 with pertinent machine data stored in machine data field 384, such as operating specifications, measured/calibrated performance parameters, maintenance logs, etc., and one or more battery ID fields 386 identifying battery(-ies) 328 deployed on the work machine 20 identified by the work machine ID 325 stored in machine ID field 382. It is to be understood that work machine ID 325 may be mechanically attached to the work machine 20 it identifies, such as by a serial number on a machine information panel permanently affixed thereto and/or by electronic storage implemented on work machine 20 that stores work machine ID 325 with other machine specific data.

Site assignments DB 364 may be populated with circuit assignments DB entries 370 associating work machines 20 with a work area 10 identified in site ID field 372. Circuit assignments DB entry 370 may include site information, such as a site map, a course data table and other geophysical information regarding a particular work area 10 in a site map/course data table field 374. Circuit assignments DB entry 370 may further include one or more machine ID fields 376 in which work machine IDs 325 of each work machine 20 deployed at the work area 10 identified in site ID field 372 may be stored.

Through the data hierarchy constructed over exemplary battery DB 368, exemplary work machine DB 366 and exemplary circuit assignments DB 364, or through a similar hierarchical data structure, a distinguishably identifiable battery 328 can be located and tracked to a particular work machine 20 deployed at a particular work area 10, even as battery 328 is redeployed on a different work machine 20 and/or at a different work area 10. Such a hierarchy affords propulsion power delivery control of the present inventive concept at different levels of granularity, e.g., at the individual work machine level and at the work machine group level.

Estimation processor 356 may be constructed or otherwise configured to estimate propulsion power levels using a variety of estimation techniques and to establish a propulsion power delivery limit 240 therefrom. Exemplary estimation techniques include proportional-integral (PI) control-based estimation, fuzzy logic, machine learning, among others. Certain estimation techniques may be based on a machine model, e.g., neural network, that is focused on propulsion power, referred to herein as a power model, that may be stored in power model DB 362.

As will be described in detail with reference to FIGS. 4-7, input data set 164, which may indicate propulsion power requirements for performing a work task, may be defined through an apparatus state, such as may be computed by apparatus state processor 355 based on machine data from machine sensor network 324, and configuration data established through configuration selector 341. A propulsion power estimation may be computed by estimation processor 356 on input data set 164 may be used to establish a propulsion power delivery limit for temporally adjacent estimation cycle.

Figure 4:
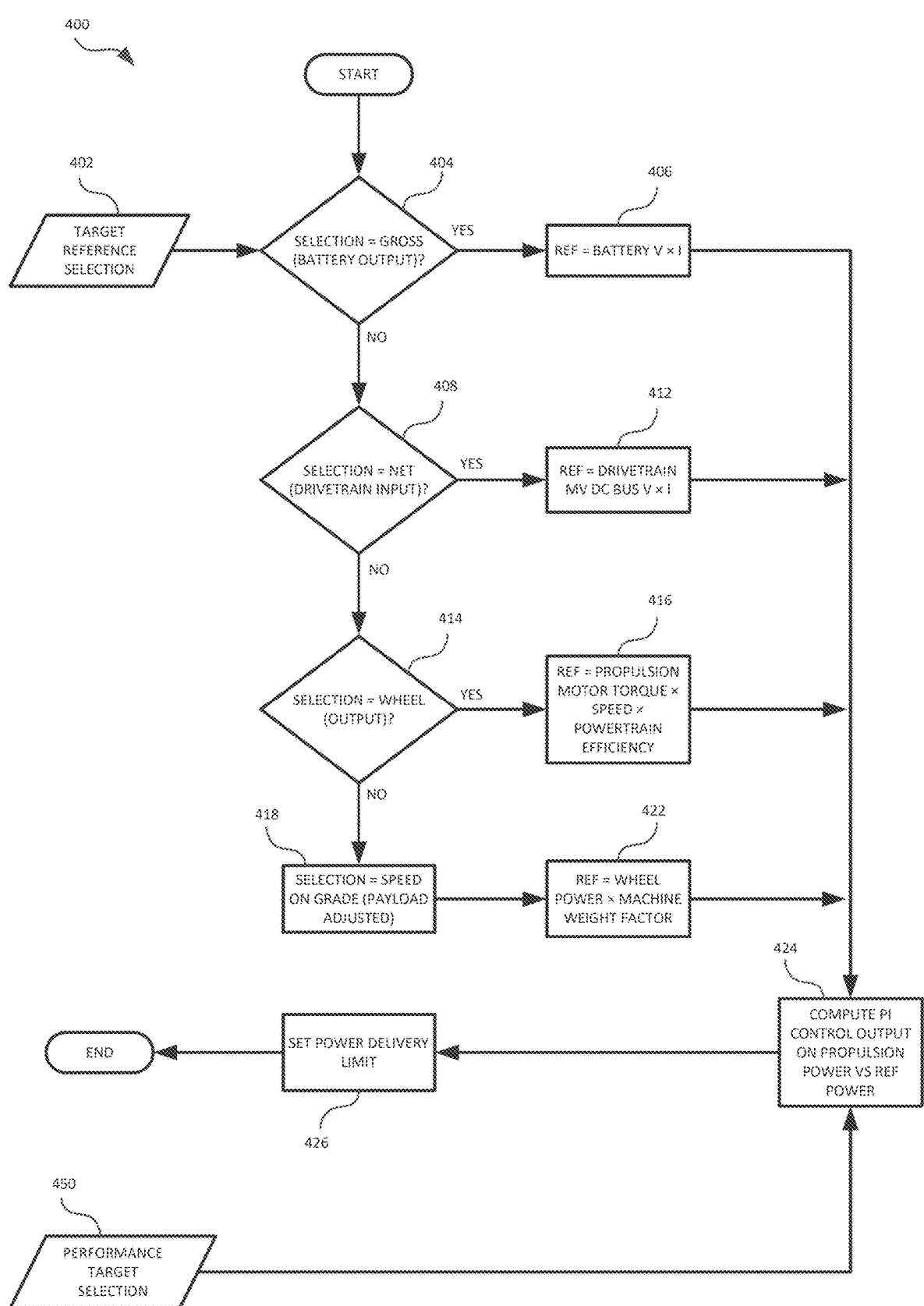
FIG. 4 is a flow diagram of an exemplary propulsion power delivery control process based on an exemplary configurable power target configuration as may be implemented in embodiments of the present inventive concept.

FIG. 4 is a flow diagram of an exemplary propulsion power delivery control process 400 based on an exemplary configurable power target control configuration 342 as may be implemented in embodiments of the present inventive concept. Configurable power target configuration 342 may afford users propulsion power delivery control through selection of a performance target 450 and a target reference 402. Exemplary target reference 402 may establish from where a power measurement is made to serve as a control reference. For example, responsive to a selection of "gross," as may be determined at operation 404, a direct battery power measurement, (voltage) V×(current) I, may be set as the target reference in operation 408. If, however, the target reference selection 402 is "net," as determined at operation 408, the reference power may be set to the drivetrain input power in operation 412, e.g., drivetrain medium voltage (MV) DC bus V×I. Responsive to target reference selection 402 being set to "wheel," as determined at operation 414, propulsion power output may be established as the target reference at operation 416, e.g., propulsion motor torque× machine speed×powertrain efficiency. Target reference selection 402 may further take on a "speed on grade" value, the target reference may be assigned, for example, wheel power×machine weight factor. The measurements used in the foregoing reference power calculations may be acquired by appropriate devices in, for example, machine sensor network 324, while characteristic parameters such as powertrain efficiency and machine weight factor may be stored machine data field 384 in work machine DB 366. The machine weight factor may be dynamically calculated onboard and changes as the payload of the machine varies from cycle to cycle. The present inventive concept may utilize a static number for rated weight.

Propulsion power delivery control using configurable power target configuration 342 may proceed using proportional-integral (PI) control techniques by which estimated propulsion power is controlled based on the calculated reference power. It is to be understood that proportional control, proportional-integral-derivative control, or any machine control technique that adjusts its output to reach an input target may also be used. Accordingly, estimation processor 356, for example, may be configured for PI control and, at operation 424, a PI control output (e.g., a propulsion power level) may be computed based on the calculated reference power associated with target reference selection 402 and on performance target selection 450. The computed PI control output vector/value may be analyzed and, when propulsion power limit criteria are met, established as the propulsion power delivery limit in operation 426.

Figure 5:
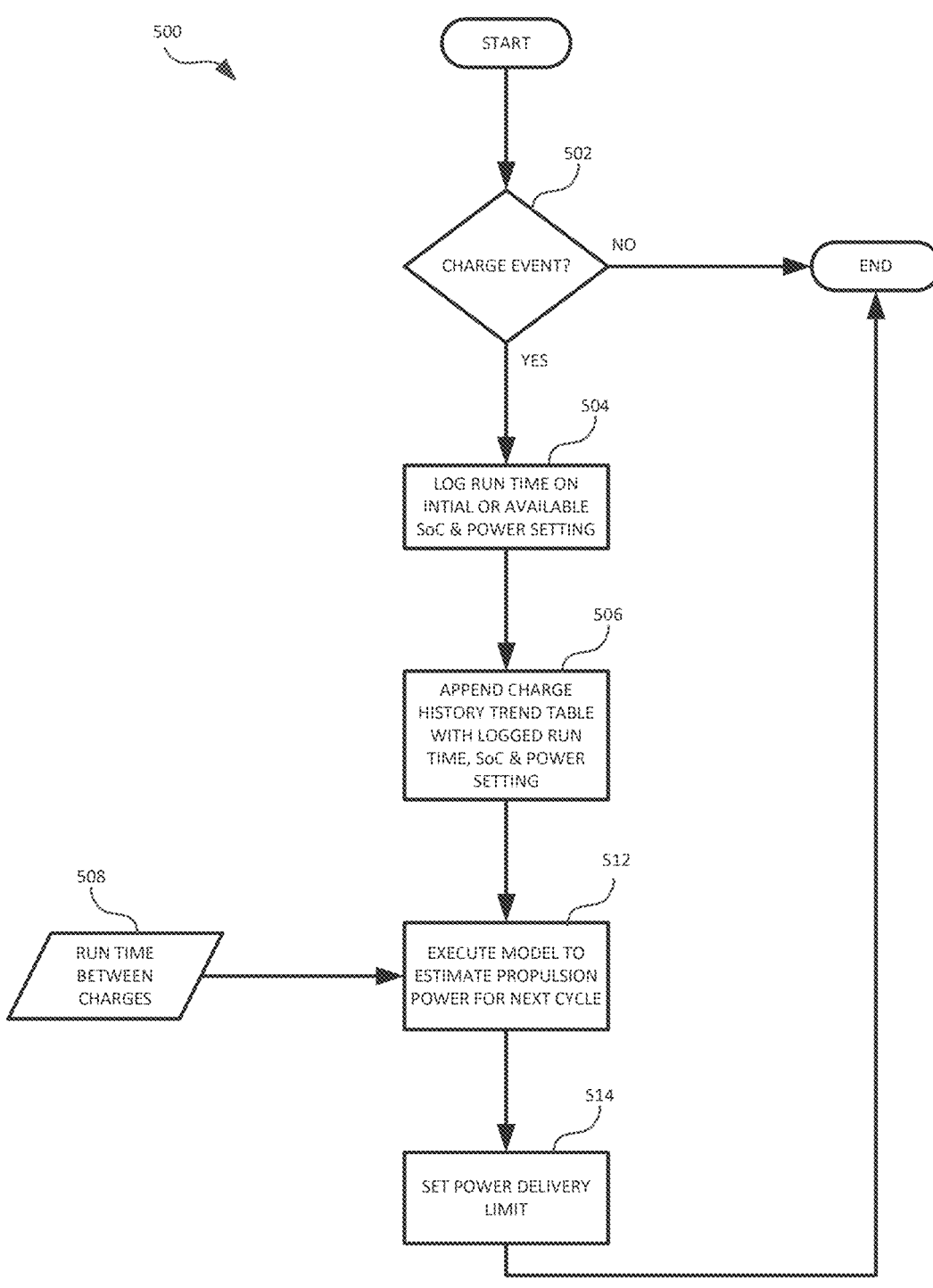
FIG. 5 is a flow diagram of an exemplary propulsion power delivery control process based on an exemplary run duration power adjustment configuration as may be implemented in embodiments of the present inventive concept.

FIG. 5 is a flow diagram of an exemplary propulsion power delivery control process 500 based on an exemplary run duration power adjustment configuration 344 as may be implemented in embodiments of the present inventive concept. In operation 502, it may be determined whether a battery charge event has occurred. If not, process 500 may exit. If, on the other hand, it is determined that a charge event has occurred, process 500 may transition to operation 504 at which machine run time and power settings for the estimation cycle are logged. The calculated machine run time may include consideration of the state of charge at each charge cycle. In operation 506, the logged run time, SoC, and power settings may be appended to charge history table 394 in battery DB 368. Propulsion power delivery control using run duration power adjustment configuration 344 may proceed by providing charge history table 394 and the most recently computed run time between charges 508 to estimation operation 512 in which propulsion power for the next estimation cycle (e.g., configurable time window or instantaneously) is computed to increase or decrease power to meet a runtime target, such as by artificial intelligence operating on a power model selected from power model DB 362. The estimated propulsion power may be analyzed and, when propulsion power limit criteria are met, established as the propulsion power delivery limit in operation 514. External inputs such as upcoming cycle definitions that are different from previous cycles, may be used to estimate a power delivery limit through simulation of the haul.

Figure 6:
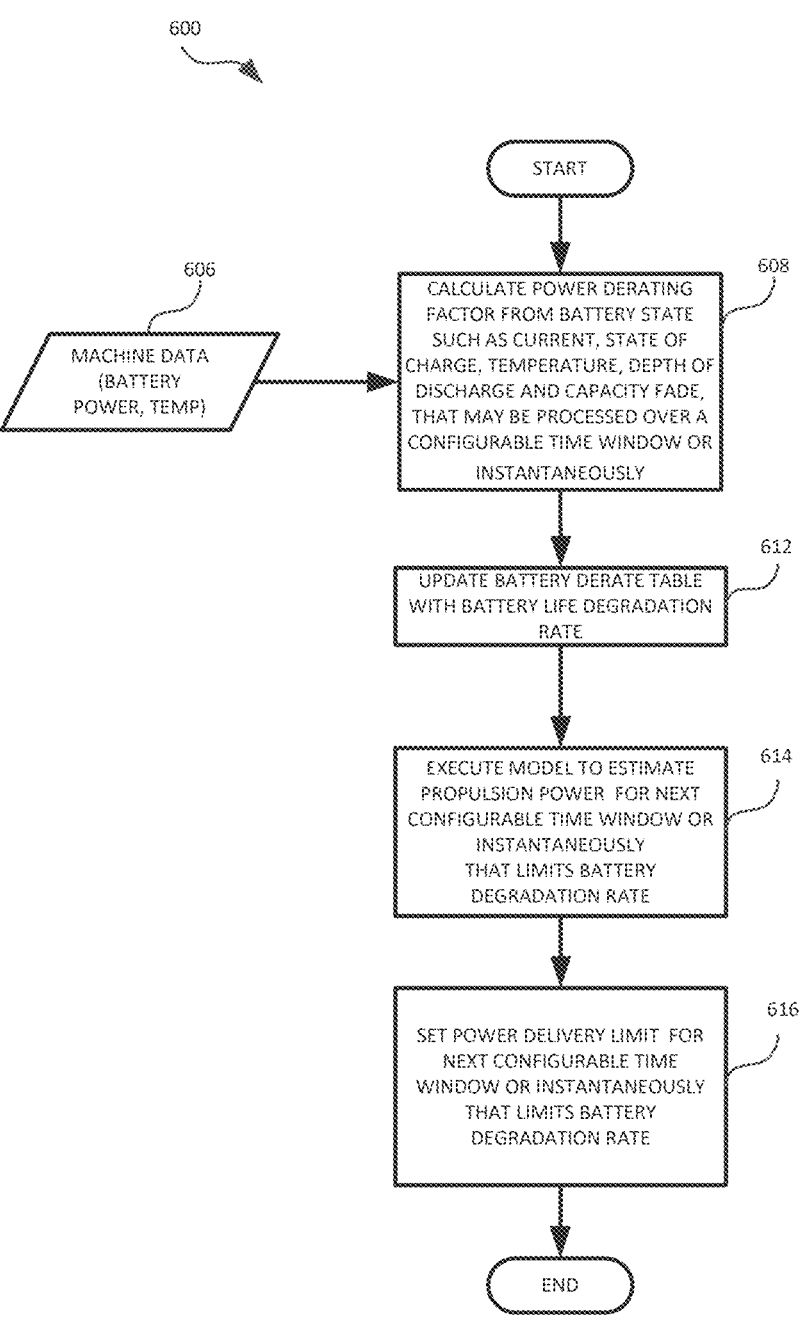
FIG. 6 is a flow diagram of an exemplary propulsion power delivery control process based on an exemplary battery life maximization configuration as may be implemented in embodiments of the present inventive concept.

FIG. 6 is a flow diagram of an exemplary propulsion power delivery control process 600 based on an exemplary battery life degradation rate power limiting configuration 346 as may be implemented in embodiments of the present inventive concept. As used herein, "battery lifetime degradation" is intended to refer to a shortening of battery life (over ideal battery having no degradation to battery life) based on operating conditions under which work machine 20 performs work. The "battery lifetime degradation rate" is intended to refer to the rate at which battery life shortens over its lifetime because of the operating conditions during a configurable time window $t_W$ or instantaneously. Propulsion power delivery control process 600 that limits the battery lifetime degradation rate may afford the best trade-off solution for battery life (lifecycle cost) and productivity.

In operation 608 whereby a power derating factor is calculated from machine data 606, e.g., acquired through machine sensor network 324, that may include battery power, temperature measurements, state of charge (SoC) measurements, depth of discharge (DoD) measurements and state of power source health (SoH) that may be processed over a configurable time window $t_W$ or instantaneously. Certain embodiments may implement near real time estimation in which $t_W$ is the system sample time, which shall be referred to herein as being instantaneous. The battery derating factor may indicate a projected battery lifetime given the operating conditions under which work machine 20 performs process 600. In operation 612, battery derate table 396 may be updated with the power derating factor computed in operation 608 as well as a battery lifetime degradation rate. In estimation operation 614, a battery degradation limit parameter may be configured (e.g., % SoH/h) and the propulsion power level that minimizes the battery life degradation rate may be calculated based on battery life degradation maps for the current conditions (SoC, SoH, Temperature, DoD) not to exceed the battery life degradation limit parameter. Estimation operation 614 may further compute propulsion power for the next estimation cycle through, for example, artificial intelligence executing a power model selected from power model DB 362 that limits the battery life degradation rate. The estimated propulsion power may be analyzed and, when propulsion power limit criteria, as a consequence of limiting propulsion power delivery to minimize the battery lifetime degradation rate parameter, are met, established as the propulsion power delivery limit in operation 616.

Configuration selector 341 may be implemented as a remote control, an event triggered control and/or a machine local control. Certain embodiments may allow configuration by the owner at the time of commissioning (or any time thereafter) and stored in persistent memory until reset or overridden by offboard input and/or adjusted by the operator during use. Additionally, configuration selector 341 may support multiple concurrent configurations as well as an arbitrator that establishes an order of execution thereof.

Figure 7A:
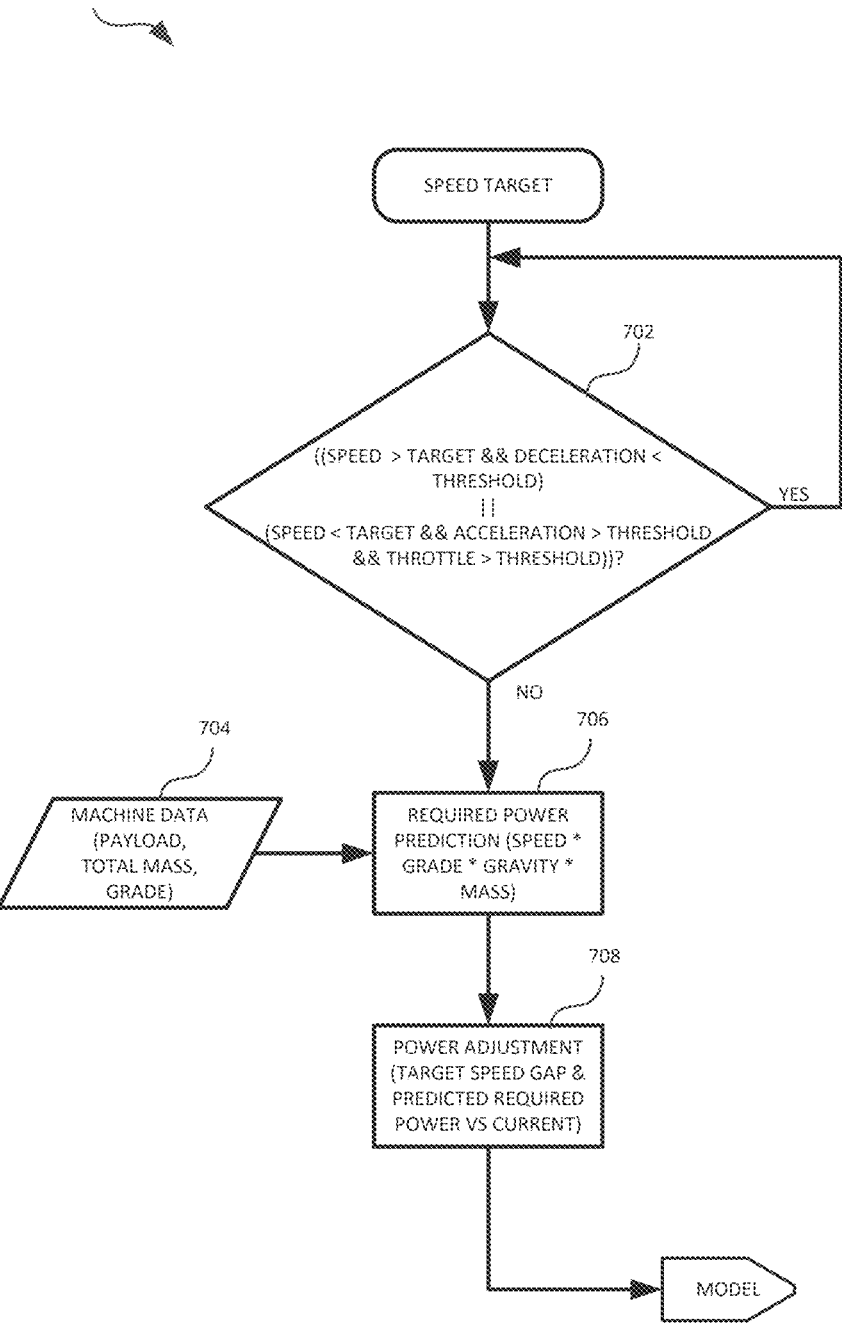
Figure 7C:
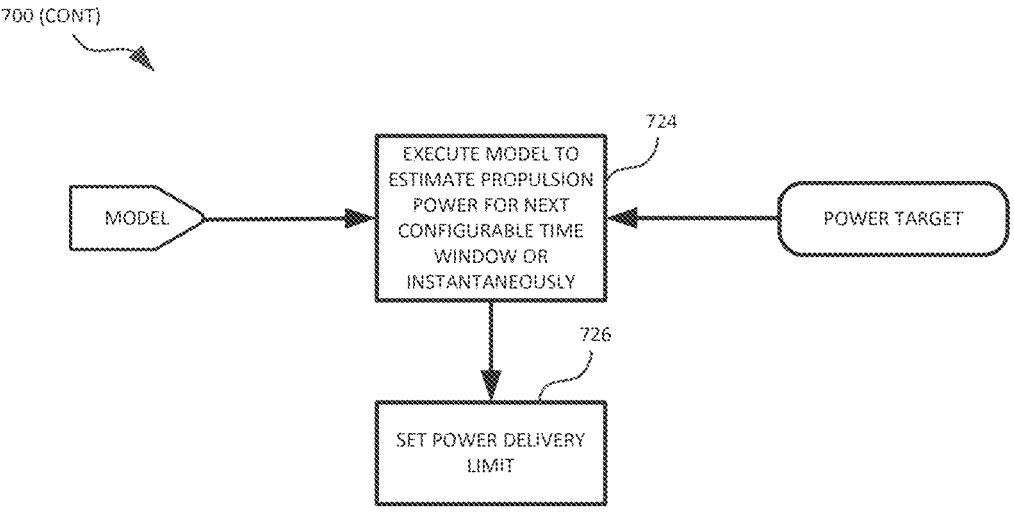

FIGS. 7A-7C, collectively referred to herein as FIG. 7, is a flow diagram of an exemplary propulsion power delivery control process 700 based on an exemplary offboard input configuration 348 as may be implemented in embodiments of the present inventive concept. Upon determination that offboard characteristics/parameters indicate a speed target 792, process 700 may transition to operation 702 where it may be determined whether at least one of two conditions is met, one for the case of deceleration (speed>speed target AND deceleration<threshold) and the other for the case of acceleration (speed<speed target AND acceleration>threshold AND throttle>threshold). Process 700 may remain at operation 702 until neither condition is met, responsive to which a required propulsion power prediction may be computed in operation 706 from machine data 704 that may include payload weight, total mass, site course segment grade, rolling resistance, among other things. The required propulsion power prediction 706 may be determined as speed×(grade+rolling resistance)×gravity× mass. In operation 708, a power adjustment may be computed from a target speed gap (e.g., the difference between the speed target 792 and the present machine speed) and the predicted required propulsion power 706 vs. the present propulsion power level.

Upon determination that offboard characteristics/parameters indicate a course data and time target 794, process 700 may transition to operation 712 where work machine operations are simulated in view of site information. A course simulation 712 may be provided initial condition information 714 for each estimation cycle (e.g., current cycle power=previous cycle power) and course data table 716, such as that stored in site map/course data table field 374, that may include course segment distances, grade, rolling resistance, speed limits, stop locations, among other things. For each course segment of a route taken by a work machine 20, resistance is calculated as mass×gravity×grade×rolling resistance, speed is calculated as propulsion power×efficiency/resistance and time is incremented by course segment distance/speed. In operation 718, it may be determined whether the difference between the calculated time from course simulation 712 and the target time 794 is less than a tolerance threshold. If so, the propulsion power computed through course simulation 712 is considered the current iteration propulsion power. If, however, the difference between the calculated time from course simulation 712 and the target time 792, as determined in operation 718, is not less than the tolerance threshold, process 700 may transition to operation 722, whereby the iteration power may be adjusted based on whether course simulation time is too long or too short.

Power adjustment 708, current iteration power 720 or a power target 796 indicated to by offboard input may be provided to estimation operation 724 in which propulsion power for the next estimation cycle $t_W$ is computed, such as by artificial intelligence operating on a power model selected from power model DB 362. The estimated propulsion power may be analyzed and, when propulsion power limit criteria are met, established as the propulsion power delivery limit in operation 726.

Certain embodiments of the present general inventive concept provide for the functional components to be manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

INDUSTRIAL APPLICABILITY

Most if not all industries seek to maximize profit by, among other things, reducing cost. Cost reduction measures include not only incorporating less expensive parts, but also extending the lifetime of expendable parts. As indicated above in the BACKGROUND section, batteries for battery electric machines and other electric vehicles constitute the greatest expense thereof while having usable lifetimes that may be shorter than the respective lifetimes of the machines in which they are installed. The techniques described herein are directed to controlling propulsion power to maximize/ optimize battery usage.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A power delivery control apparatus for work machines that derive propulsion power from electrical power sources during a work task, the power delivery control apparatus comprising:

data processor circuitry constructed to:

accept a data set indicating a propulsion power requirement for performing the work task; and generate power delivery limit data from the data set defining a propulsion power delivery limit on the propulsion power during performance of the work task; and power controller circuitry of a distinguishably identifiable work machine communicatively coupled to the data processor circuitry and constructed to:

accept the power delivery limit data from the data processor circuitry; and limit the propulsion power of the distinguishably identifiable work machine to the propulsion power delivery limit during performance of the work task regardless of demand for the propulsion power beyond the propulsion power delivery limit, wherein the data processor circuitry is constructed to:

accept the data set having, as the propulsion power requirement:

a selected power target specifying a performance level on the work task, and a power reference against which performance in meeting the selected power target is measured, and generate the propulsion power delivery limit from a propulsion power level computed based on the selected power target and the power reference, wherein the selected power target and the power reference represent actual power use.

2. The power delivery control apparatus of claim 1, wherein the propulsion power level is computed through proportional-integral control computations taking the selected power target and the power reference as input thereto.

3. The power delivery control apparatus of claim 2, wherein the data processor circuitry is located onboard the distinguishably identifiable work machine.

4. The power delivery control apparatus of claim 1, wherein the data processor circuitry is constructed to:

accept the data set having, as the propulsion power requirement, a target runtime of the distinguishably identifiable work machine on power derived from an onboard set of the electrical power sources over a charge cycle having an initial battery state of charge; and generate the propulsion power delivery limit from the propulsion power level also computed through artificial intelligence constructed from a computational model of the distinguishably identifiable work machine, the computational model being trained on data samples including a previously accepted target runtime over the charge cycle having the initial battery state of charge.

5. The power delivery control apparatus of claim 4, wherein the data processor circuitry on which the artificial intelligence is implemented is located onboard the distinguishably identifiable work machine.

6. The power delivery control apparatus of claim 1, wherein the data processor circuitry is constructed to:

accept the data set having, as the propulsion power requirement, a battery lifetime degradation rate power limit on a distinguishably identifiable electrical power source onboard the distinguishably identifiable work machine; and generate the propulsion power delivery limit from the propulsion power level also computed through artificial intelligence constructed from a computational model of the distinguishably identifiable work machine, the computational model being trained on data samples including the battery lifetime degradation rate power limit.

7. The power delivery control apparatus of claim 1, wherein the data processor circuitry is constructed to:

coordinate propulsion across the work machines through selection of respective performance targets;

accept the data set having, as the propulsion power requirement, a power level associated with a performance target selected from the respective performance targets; and generate the propulsion power delivery limit from the propulsion power level also computed through artificial intelligence implementing a computational model of the distinguishably identifiable work machine, the computational model being trained on data samples including the propulsion power level selected in accordance with the performance target.

8. The power delivery control apparatus of claim 7, wherein:

the performance target is a speed target of the distinguishably identifiable work machine as measured by an onboard sensor; and the propulsion power level is a power adjustment level computed from a difference between a current speed and the speed target, and a difference between a current measured power and predicted power for a given payload, grade of a course over which the work task is performed and rolling resistance.

9. The power delivery control apparatus of claim 7, wherein:

the performance target is a time target for traversal of a course over which the work task is performed by the distinguishably identifiable work machine as measured by an onboard sensor; and the propulsion power level is computed from a difference between a current speed and a speed target, and a difference between a current measured power and predicted power for a given pay load and grade of a course on which the work task is performed in the target time.

10. The power delivery control apparatus of claim 7, wherein:

the performance target is a propulsion power target of the distinguishably identifiable work machine as measured by an onboard sensor; and the propulsion power level is equal to the propulsion power target.

11. A system constructed to coordinate machine propulsion across distinguishably identifiable work machines performing respective work tasks at distinguishably identifiable work sites, each deriving propulsion power from distinguishably identifiable electrical power sources onboard each of the distinguishably identifiable work machines, the system comprising:

an enterprise infrastructure communicatively coupled to the work machines and comprising:

non-transitory computer-readable memory circuitry constructed to retain a database therein that associates the electrical power sources with the corresponding work machines and the work machines with the corresponding work sites; and data processor circuitry constructed to:

execute management process instructions to coordinate propulsion across the work machines associated with the electrical power sources and with the work sites in the database, the propulsion being coordinated across the work machines through selection of respective performance targets; and accept power levels associated with the respective performance targets; and power controller circuitry deployed on the respective work machines constructed to:

generate propulsion power delivery limits from propulsion power levels computed through artificial intelligence implementing computational models of the respective work machines, the computational models being trained on data samples including the propulsion power level selected in accordance with the respective performance targets; and limit the propulsion power of each of the work machines to the propulsion power delivery limits regardless of demand for the propulsion power beyond the propulsion power delivery limit, wherein the data processor circuitry is constructed to:

accept the data set having, as the propulsion power requirement:

a selected power target specifying a performance level on the work task, and a power reference against which performance in meeting the selected power target is measured, and generate the propulsion power delivery limit from a propulsion power level computed based on the selected power target and the power reference, wherein the selected power target and the power reference represent actual power use.

12. The system of claim 11, wherein:

the performance targets include a speed target of a work machine; and the propulsion power levels include a power adjustment level computed from a difference between a current speed and the speed target, and a difference between a current measured power and predicted power for a given payload and grade of a course over which the propulsion is performed.

13. The system of claim 11, wherein:

the performance targets include a time target for traversal of a course over which a work machine is propelled; and the propulsion power levels are computed from a difference between a current speed of the work machine and a speed target, and a difference between a currently measured power and predicted power for a given payload and grade of a course on which the work machine is propelled in the target time.

14. The system of claim 11, wherein:

the performance targets include a propulsion power target of a work machine; and the propulsion power levels include the propulsion power target.

15. The system of claim 11, wherein the electrical power sources are electrical batteries.

16. A method of power delivery control for work machines that derive propulsion power from electrical power sources during a work task, the method comprising:

accepting a data set indicating a propulsion power requirement for performing the work task;

generating power delivery limit data from the data set defining a propulsion power delivery limit on the propulsion power during performance of the work task;

limiting the propulsion power of the work machine to the propulsion power delivery limit during performance of the work task regardless of demand for the propulsion power beyond the propulsion power delivery limit;

accepting the data set having, as the propulsion power requirement:

a selected power target specifying a performance level on the work task, and a power reference against which performance in meeting the selected power target is measured; and generating the propulsion power delivery limit from a propulsion power level computed based on the selected power target and the power reference, wherein the selected power target and the power reference represent actual power use.

17. The method of claim 16, further comprising:

computing the propulsion power level through proportional-integral control computations taking the selected power target and the power reference as inputs.

18. The method of claim 16, further comprising:

accepting the data set having, as the propulsion power requirement, a maximum runtime of the work machine on power derived from an onboard set of the electrical power sources over a charge cycle, and a logged power setting; and generating the propulsion power delivery limit from the propulsion power level also computed through artificial intelligence constructed from a computational model of the work machine, the computational model being trained on data samples including the maximum runtime over the charge cycle and the logged power setting.

19. The method of claim 16, further comprising:

accepting the data set having, as the propulsion power requirement, a battery life degradation rate power limit on a distinguishably identifiable electrical power source onboard the work machine; and generating the propulsion power delivery limit from the propulsion power level also computed through artificial intelligence constructed from a computational model of the work machine, the computational model being trained on data samples including the battery lifetime degradation rate power limit.

20. The method of claim 19, further comprising deploying electrical batteries as the electrical power sources.

* * * * *